Aug. 21, 1923.  
J. S. HUNTER  
1,465,604  
BEEF CARCASS SPLITTING MACHINE  
Filed Feb. 1, 1922   2 Sheets-Sheet 2
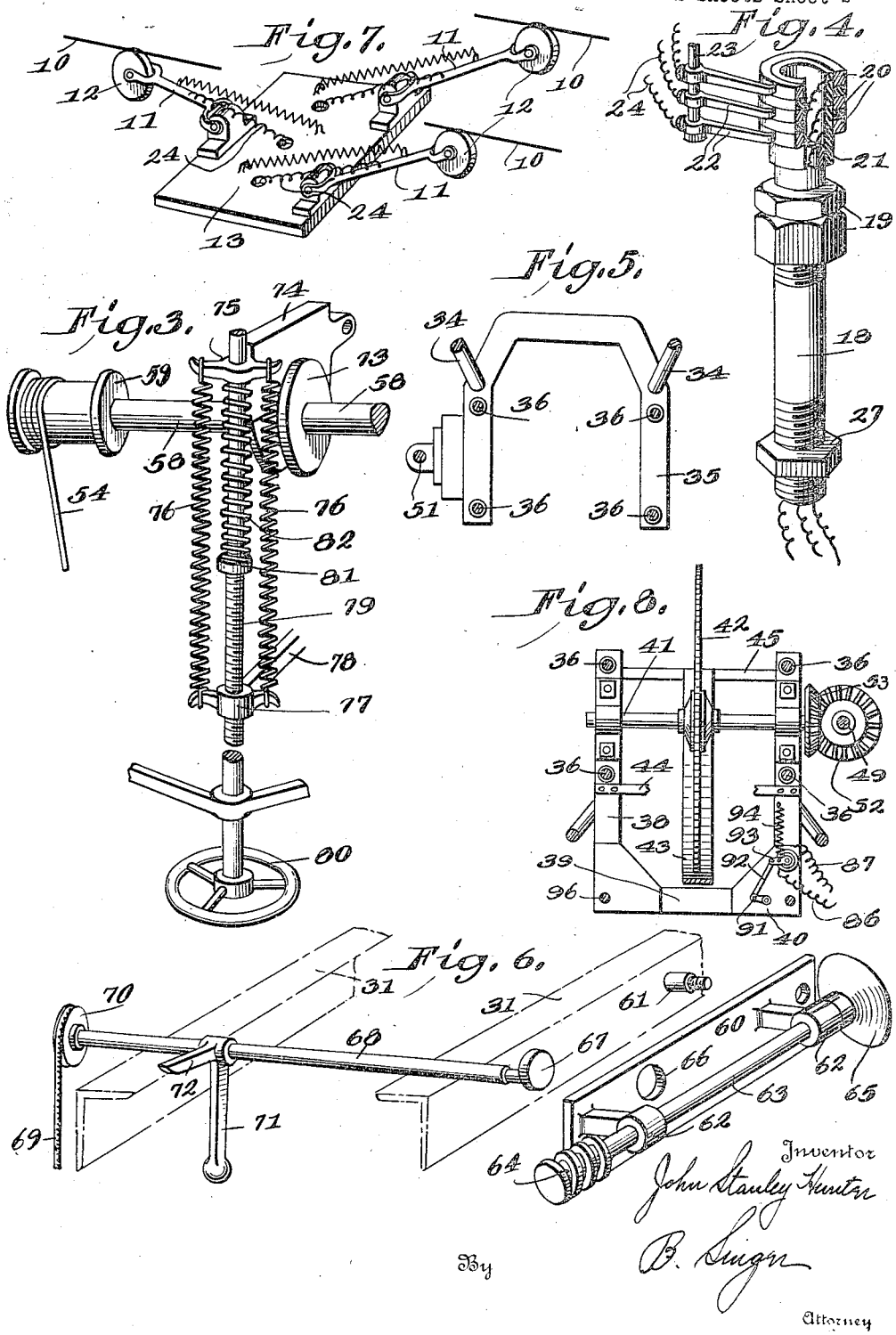

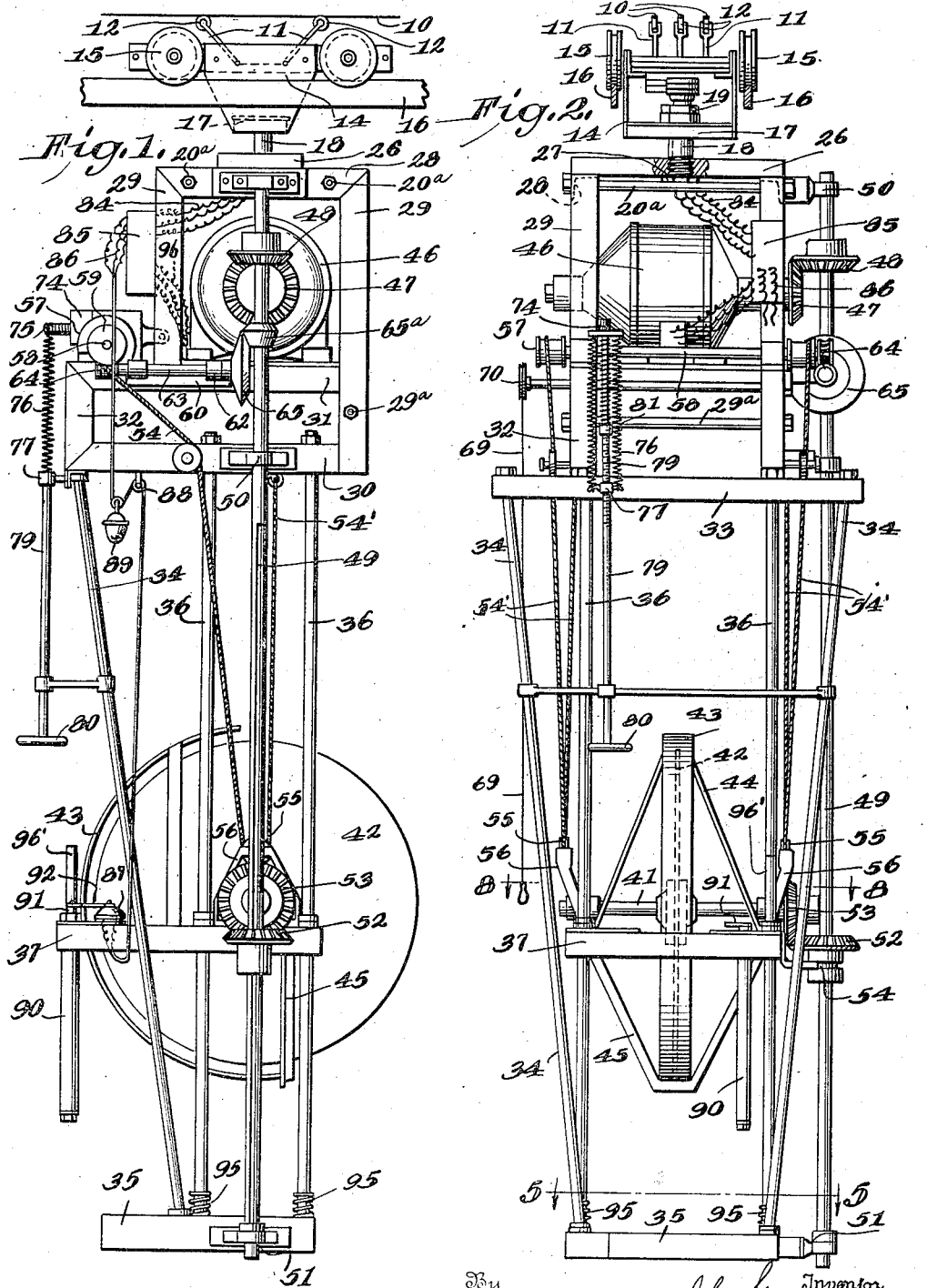

Patented Aug. 21, 1923.

1,465,604

UNITED STATES PATENT OFFICE.

JOHN STANLEY HUNTER, OF MANLY, NEW SOUTH WALES, AUSTRALIA.

BEEF-CARCASS-SPLITTING MACHINE.

Application filed February 1, 1922. Serial No. 533,353.

*To all whom it may concern:*

Be it known that I, JOHN STANLEY HUNTER, a subject of the King of Great Britain and Ireland, residing at 24 Pine Street, Manly, in the State of New South Wales, Commonwealth of Australia, have invented certain new and useful Improvements in Beef-Carcass-Splitting Machines, of which the following is a specification.

This invention relates to machines in which a circular saw is movable in a vertical direction for the purpose of longitudinally splitting a beef carcass from the aitchbone to the neck.

The general object of the invention is to provide an improved machine in which an electro-mechanically driven circular saw is movable vertically. Another object is to provide a machine which may be moved from place to place in a building thus obviating the bringing of all carcasses to one location in the building. A further object of the invention is to provide a machine in which the plane of the circular saw may be turned in either direction to any point of the compass.

A further object of the invention is to provide a machine occupying a minimum amount of floor space, requiring no levers or counterweights to balance the saw frame, and in which the feed of the saw is effected by gravity.

A further object of the invention is to provide a machine in which the saw is arranged to cut into the back of the carcass and through both aitchbone and scrag, and in which the operator stands behind the saw.

A still further object of the invention is to provide a machine which may be easily operated by one person.

The invention consists in various novel features and combinations of parts as will be ascertained from the following description and which are particularly specified in the appended claims.

Reference is here made to the accompanying drawings which depict beef-carcass splitting machine construction according to my invention, and in which—

Fig. 1 is a side view and

Fig. 2 a back view of the machine,

Fig. 3 a detail in perspective of braking gear and part of the lifting mechanism, Fig. 4 a perspective view of a tubular king bolt and electric connections thereon and associated therewith, Fig. 5 a plan on line 5.5 of Fig. 2 viewed from the front of the machine, Fig. 6 a perspective detail of friction clutch operating mechanism, the parts being shown separated for the sake of clearness of illustration, Fig. 7 a perspective view of a trolley pole plate with three poles attached thereto and with rollers respectively engaging three trolley wires, and Fig. 8 a plan on line 8.8 of Fig. 2.

It is to be understood that the construction illustrated and described is explanatory only and is not to be taken as limiting my invention, as same may be varied in any suitable and convenient manner falling within the scope of the appended claims.

In the drawings I have shown three trolley wires 10 and three trolley poles 11 and rollers 12 respectively engaging said wires, this arrangement permitting the employment of either an A. C. or D. C. motor as will be well understood.

Said trolley poles are attached in known manner as shown in Fig. 7 to a plate 13 of insulating material which is supported on a travelling carriage 14 having two pairs of wheels 15 bearing upon rails 16 suspended in known manner from the roof or ceiling of the building or chamber in which the machine is installed.

Secured to the lower portion of the carriage 14 is a suspension plate 17 in which is rotatably mounted a tubular king-bolt 18 fitted at its upper end with nuts 19 which support the load of suspended parts hereinafter described, and above said nuts are insulated current collecting rings 20, affixed on an insulating tube 21 screwed on to the top of the king bolt (see Fig. 4). Contacting with said rings are brushes 22 carried on a fixed spindle 23 and respectively connected by leads 24 to the trolley poles in known manner.

The lower end of the king bolt screws into a cross beam 26 and is terminally fitted with a lock nut 27.

The cross beam 26 bridges the space between and is attached to the upper horizontal members 28 of a top frame composed of structural angle steel and comprising four main vertical members 29, two lower horizontal members 30, two intermediate horizontal members 31, and two short vertical members 32 joining corresponding ends of the horizontal members 30 and 31. Under the ends of members 30 is attached an angle bar 33. The rods 20ª connect the horizontal members 28, and a tie rod 29ª the lower ends of the vertical members 29.

The manner of jointing up the various members of the top frame invention need not be further described, as same may be done in any suitable manner as by riveting, bolting or welding.

From the ends of this angle bar 33 depend a pair of inwardly inclined stay rods 34 attached at their lower ends to a fixed bottom frame 35 consisting of an angle piece bent to substantially U form as shown in Fig. 5.

Four rigid parallel and vertical guide rods 36 extend between the bottom frame 35 and the lower horizontal members 30 of the top frame, their respective bottom and top ends being secured in said elements. Said guide rods also serve to support the bottom frame in a horizontal position.

Slidably mounted in the guide rods 36 so as to be movable vertically is an intermediate frame 37 of the form and construction shown in Fig. 8 and comprising a pair of horizontal side members 38 joined at their rear ends by a cross member 39 jointed to said side members by angle plates 40. On this frame is transversely mounted a spindle 41 on which is secured in any suitable manner a circular saw 42 protected by a semicircular guard 43 terminally attached to upper stays 44 and a lower U shaped stay 45, said stays being secured to the side members 38 of the frame.

Supported in the upper frame in an electric motor 46, and on the armature shaft thereof is a bevel gear 47 meshing with a gear 48 fixed on a vertical side shaft 49 rotatably carried in bearings 50 on the upper frame and in a bearing 51 on the lower frame 35.

On said side shaft 49 is a bevel gear 52 held in engagement with a bevel gear 53 on the saw spindle 41 by means of a forked arm 54 projecting from the saw frame 37, said forked arm engaging an annular groove in the boss of gear 52 in known manner. Said gear 52 is caused to rotate with shaft 49 by means of a feather in its bore engaging a featherway cut longitudinally in the shaft 49 and extending the full length of the travel of frame 37, so that said gear 52 is free to move vertically with said frame. This is known mechanical construction and need not be further described.

The saw frame 37 is suspended by means of ropes 54′ terminally attached to the upper frame, reeving through pulleys 55 pivotally mounted on brackets 56 on the saw frame, and at their other ends attached to winding drums 57 on shaft 58 which is rotatably mounted on the upper frame. On one end of said shaft 58 is a worm wheel 59.

Affixed to one of the horizontal members 31 of the upper frame is a plate 60 oscillatable in a vertical plane on a pivot 61 (see Fig. 6) projecting from said member. On this plate 60 is a pair of dead eye bearings 62 in which is rotatably mounted a shaft 63 carrying at one end a worm 64 registering with the worm wheel 59 on shaft 58, and at the other end a friction clutch member 65.

Said clutch member 65 co-operates as hereinafter explained, with a complementary clutch member 65ª affixed on the side shaft 49.

The plate 60 has through it a transverse circular hole 66 in which takes an eccentric. Sheave 67 on a spindle 68 having bearing in the longitudinal members 31 of the upper frame (see Fig. 6) and rotatable by means of a handrope 69 secured to a pulley 70 mounted on the end of said spindle 68. The rotation of said spindle is limited by stops constituted by a bell crank affixed on spindle 68 and having arms 71 and 72. Arm 71 is weighted and tends to normally retain the shaft in such position that the eccentric sheave 67 is horizontal, in which case the end of plate 60 adjacent the worm 64 on shaft 63 is in its lowest position its further descent being limited by arm 72 bearing against the juxtaposed frame member 31, and the worm 64 is not in engagement with worm wheel 59 and friction clutch member 65 does not contact with the complementary member 65ª. By pulling on rope 69 sufficiently to turn the shaft one quarter of a circle and bringing stop arm 72 into contact with frame member 31, the eccentric sheave is turned upwardly and the plate 60 with shaft 63 is raised thus effecting engagement of clutch members 65 and 65ª and of worm 64 and worm wheel 59. The shaft of motor 46 is thus geared to the winding shaft 58 and rotation of the latter winds the lifting ropes on the drums 57 and raises the saw platform 37.

When the desired elevation is reached the motor is stopped and the saw frame held by means of brake gear manually or automatically actuated by the operator or machine. This brake gear (see Fig. 3) comprises a brake drum 73 affixed on the winding shaft 58, a brake shoe 74 pivoted to one of the vertical members 29 of the upper frame and bearing on said brake drum. At the free end of the shoe a doubly horned plate 75 projects to which are attached a pair of tension springs 76 connected at their other ends to a doubly horned nut 77 formed on the end of a bracket 78 attached to angle bar 33 on the upper frame. Screwing through said nut is a vertical spindle 79 terminally provided with a hand wheel 80, and carrying a fixed collar 81. The upper end of the spindle passes freely through the horned plate 75 and between said plate and said collar 81 is a coil spring 82 acting in opposition to springs 76. To release the brake shoe the spindle 79 is vertically screwed upwardly through the nut 77 until spring 82 is compressed sufficiently to overcome the tension of springs 76, while by screwing spindle 79 in the reverse direction the tension of spring 82 is relaxed and springs 76 apply the brake. This arrangement of springs provides an extremely sensitive and gentle though powerful brake action.

The electrical connections required for the control of the motor are of any suitable type and arranged in any convenient and appropriate way, but as an example only I show leads 84 from the current collector rings 20 through the king bolt 18 to remote control apparatus housed in a box 85 affixed to the upper frame. Said remote control apparatus need not be further described as it is a well known electrical contrivance, and from same, leads 86 are connected in known manner to a rotary switch 87 on the saw frame 37, said leads 87 reeving through a pulley 88, a counterbalance 89 being suspended in the bight thus formed. The switch is actuated by a vertical rotatable handle 90 carrying on its upper end a lever 91 which is connected by a link 92 to a lever 93 on the switch, said lever 93 being attached to a spring 94 by which it is returned to "off" position. It will thus be seen that should the operator release the handle 90 current is immediately cut off from the motor and the saw will cease to rotate. Leads 96 connect the remote control apparatus and the motor.

At the base of the guide rods 36 coil springs 95 are provided to cushion the drop of the saw frame should same descend too far or too fast.

Handles 96' upstanding from the saw-frame afford convenient means whereby the whole of the suspended parts of the machine may be turned so that the saw is properly presented to the carcass to be operated upon.

What I claim and desire to secure by Letters Patent is:—

1. In a beef-carcass splitting machine, in combination, a travelling carriage, an upper frame suspended therefrom and capable of rotating in a horizontal plane, an electric motor carried on said upper frame, a lower frame suspended and distanced from said upper frame, guiding means extending between said upper and lower frames, an intermediate frame slidable in said guiding means, a circular saw on a spindle mounted horizontally on said intermediate frame, means for conveying and controlling electric current to said motor, controlled means operated by the motor for moving said intermediate frame vertically in one direction, and gearing between the shaft of said motor and the saw spindle.

2. In a beef-carcass splitting machine, in combination, a travelling carriage, a frame suspended therefrom and rotatable in a horizontal plane, an electric motor on said frame, vertical guides pendent from said frame, a saw-frame vertically movable on said guides, controlled means operated by the motor for moving said saw frame vertically in one direction, and gearing between the shaft of the motor and the saw spindle.

3. In a beef-carcass splitting machine, in combination, a frame rotatable in a horizontal plane and suspended from a travelling carriage, vertical guides pendent from said frame, a saw frame vertically slidable in said guides, a circular saw fixed on a horizontal spindle rotatably mounted in said saw frame, controlled means operated by the motor for vertically moving said saw frame in one direction, a vertical side shaft rotatable in bearings and geared to the shaft of said motor, and a gear wheel rotating with but slidable axially on said side shaft and meshing with a complementary gear on the saw spindle.

4. In a beef-carcass splitting machine which includes an upper motor-carrying frame rotatably suspended from a travelling carriage and a circular saw frame movable vertically in guides below said upper frame, means for lifting said saw frame, said means comprising in combination ropes attached at one end to said saw frame, a winding shaft rotatably mounted on said upper frame, winding drums on said shaft, and clutch gearing between the shaft of said motor and said winding shaft.

5. In a beef-carcass splitting machine which includes an upper motor carrying frame rotatably suspended from a travelling carriage and a circular saw frame movable vertically in guides below said upper frame, means for lifting said saw frame, said means comprising in combination ropes attached at one end to said saw frame, a winding shaft rotatably mounted on said upper frame, winding drums on said shaft, a worm wheel on said winding shaft, a rotatable spindle mounted to oscillate lengthwise, a worm on said spindle, a friction clutch member on said spindle, a complementary friction clutch member geared to the shaft of the motor, and releasable means for oscillating said spindle lengthwise to bring said worm into engagement with the worm wheel and the clutch members into mutual engagement.

6. In a beef-carcass splitting machine in which a vertically movable circular saw frame is suspended below a horizontally rotatable frame carrying an electric motor and in which said saw frame is suspended by ropes engaging winding drums on a shaft rotated by the motor, braking means for releasably retaining said saw frame in raised position, said braking means comprising in combination a brake drum on said winding shaft, a brake block normally spring pressed into contact with said brake drum, a spindle screwing through a fixed nut and operating to regulate said contact, and a cushioning spring interposed between said brake block and an abutment on said spindle.

7. A beef-carcass splitting machine comprising in combination a wheeled overhead travelling carriage, current collectors thereon, an upper frame suspended from said carriage and horizontally rotatable, an electric motor on said frame, electric connections from said current collectors to said motor, a switch in said connections, a lower frame suspended and distanced from said upper frame, vertical parallel guides extending between said upper and lower frames, a saw-frame vertically sliding in said guides between the upper and lower frames, a circular saw on a spindle rotatably mounted in said saw-frame, a vertical side shaft geared to the shaft of said motor, gearing between said shaft and saw spindle, lifting ropes attached to said saw frame, and connected to winding drums fixed on a rotatable winding shaft on said upper frame, a worm wheel on said winding shaft, a spindle oscillatable lengthwise and rotatably mounted on said upper frame, a worm on one end of said oscillatable spindle registering with said worm wheel, a friction clutch member on the other end of the same spindle, a complementary friction clutch member on said side shaft, means for actuating said oscillatable spindle to bring said worm and worm gear and clutch members respectively into engagement, and braking means operating to releasably retain the saw frame in any position, all combined constructed and arranged substantially as described.

Signed at Sidney N. S. W. this nineteenth day of December A. D. 1921.

JOHN STANLEY HUNTER.